US008978407B2

(12) United States Patent
Herbert et al.

(10) Patent No.: US 8,978,407 B2
(45) Date of Patent: Mar. 17, 2015

(54) ABSORPTION PLATE FOR AN AIR-CONDITIONER

(75) Inventors: Vincent Herbert, Orsay (FR); Remi Goulet, Versailles (FR)

(73) Assignee: Peugeot Citroën Automobiles SA, Route de Gisy, Velizy Villacoublay (FR)

( * ) Notice: Subject to any disclaimer, the term of this patent is extended or adjusted under 35 U.S.C. 154(b) by 0 days.

(21) Appl. No.: 14/119,399

(22) PCT Filed: May 14, 2012

(86) PCT No.: PCT/FR2012/051060
§ 371 (c)(1),
(2), (4) Date: Jan. 21, 2014

(87) PCT Pub. No.: WO2012/164188
PCT Pub. Date: Dec. 6, 2012

(65) Prior Publication Data
US 2014/0202200 A1    Jul. 24, 2014

(30) Foreign Application Priority Data

May 27, 2011  (FR) ..................................... 11 54624
May 27, 2011  (FR) ..................................... 11 54625
May 27, 2011  (FR) ..................................... 11 54626

(51) Int. Cl.
*F25B 37/00* (2006.01)
*F25B 15/00* (2006.01)
*B60H 1/32* (2006.01)

(52) U.S. Cl.
CPC .............. *F25B 15/00* (2013.01); *B60H 1/3201* (2013.01); *F25B 37/00* (2013.01)
USPC ................... 62/494; 62/497; 62/484; 62/485

(58) Field of Classification Search
CPC ........... F25B 15/10; F25B 37/00; F25B 35/00
USPC .................... 62/494, 497, 484, 485
See application file for complete search history.

(56) References Cited

U.S. PATENT DOCUMENTS 4,223,539 A   9/1980  Webb et al.
4,290,981 A   9/1981  Schramm
(Continued)

FOREIGN PATENT DOCUMENTS

DE          2848386 A1      5/1980
DE      102008044482 A1     3/2010
(Continued)

OTHER PUBLICATIONS

International Search Report of corresponding application PCT/FR2012/051060 dated Sep. 13, 2012.
Written Opinion of corresponding application PCT/FR2012/051060 dated Nov. 27, 2013.

*Primary Examiner* — Cassey D Bauer
(74) *Attorney, Agent, or Firm* — Polster, Lieder, Woodruff & Lucchesi, L.C.

(57) ABSTRACT

The invention relates to an absorption plate for a vehicle air-conditioner, through which a flow of absorbent fluid (110) passes, said fluid flowing along at least one exchange surface (130), the exothermic absorption of a coolant occurring through said at least one exchange surface (130) by increasing the concentration of the coolant in the absorbent fluid (110), the plate comprising, along said at least one exchange surface (130), a means (150) for rendering the temperature of the flow of absorbent fluid uniform, characterized in that the means (150) for rendering the temperature uniform is a separate turbulence means for said at least one exchange surface (130), and increases the turbulence of the flow of absorbent fluid (110) along said at least one exchange surface (130).

11 Claims, 3 Drawing Sheets

(56) References Cited

U.S. PATENT DOCUMENTS

| | | |
|---|---|---|
| 4,338,268 A | 7/1982 | Wilkinson et al. |
| 4,467,623 A * | 8/1984 | Reimann .......... 62/494 |
| 4,534,175 A | 8/1985 | Kogan et al. |
| 5,704,417 A | 1/1998 | Christensen et al. |
| 6,314,752 B1 * | 11/2001 | Christensen et al. ........ 62/484 |

FOREIGN PATENT DOCUMENTS

| | | |
|---|---|---|
| EP | 2213963 A1 | 8/2010 |
| FR | 2900722 A1 | 11/2007 |
| FR | 2921467 A1 | 3/2009 |
| FR | 2941773 A1 | 8/2010 |
| GB | 2130499 A | 6/1984 |

* cited by examiner

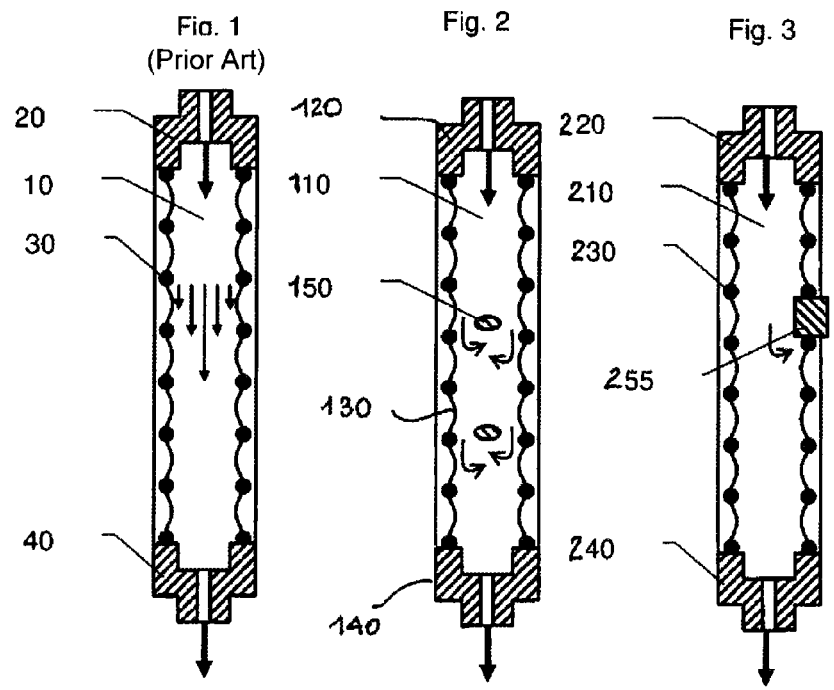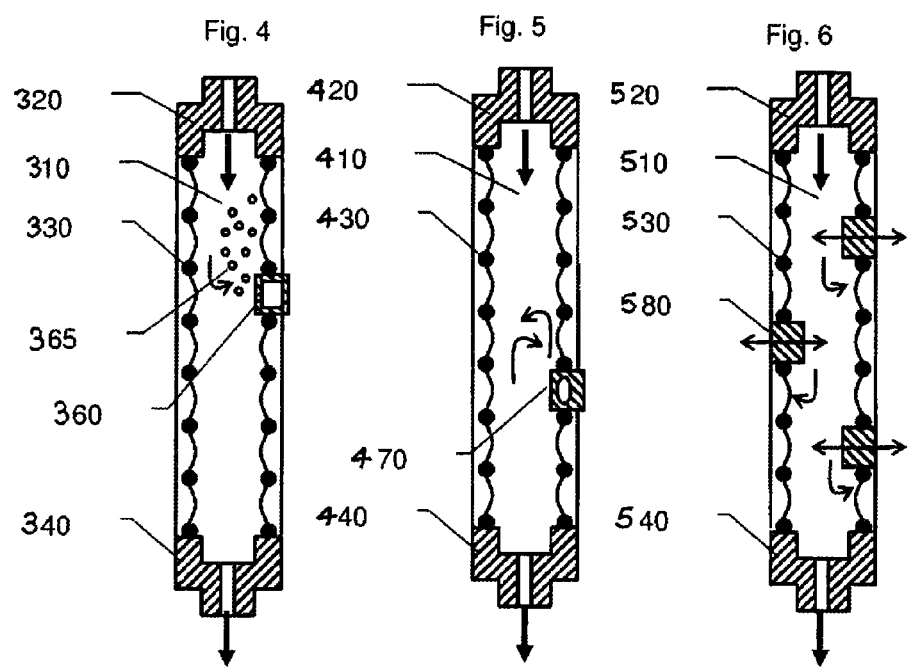

ABSORPTION PLATE FOR AN AIR-CONDITIONER

CROSS-REFERENCE TO RELATED APPLICATIONS

This application is the US National Stage under 35 USC §371 of International Application No. PCT/2012/051060 filed May 14, 2012, which in turn, claims priority to French App. Nos. 1154624, 1154625, and 1154626 all of which were filed on May 27, 2011.

BACKGROUND

The present invention relates generally to an absorption plate for an air conditioner mounted on an automobile.

Devises for air conditioning by absorption are known in the prior art. For example, document FR 2 941 773 describes an air conditioner by absorption comprising absorption plates in which an absorbing fluid, lithium bromide, circulates and absorbs a refrigerating fluid, water vapor. On the other hand, this system has in particular the disadvantage of presenting an efficiency limited by the absorption capacities of the absorbing fluid in the refrigerating fluid. In fact, during the exothermic reaction of absorption on the surface, the absorbing fluid, lithium bromide, in contact with the refrigerating fluid, water vapor, heats up and the surface layer is rapidly saturated with refrigerating fluid. The absorption is limited by the transfer rate toward the center of the heat flow released and/or of the refrigerating fluid. The result is a rather weak total efficiency of the system because the transfer rate (of the heat released and of the refrigerating fluid absorbed) in the direction of the center of the flow of absorbing solution very strongly limits the absorption capacities during the traversing of the plate.

Moreover, the document U.S. Pat. No. 4,223,539 describes another type of air conditioner by absorption in which the absorbing fluid is sprayed onto refrigerating tubes where it flows out and absorbs the refrigerating fluid, and the surface of these tubes comprises protuberances creating a surface turbulence. Such an implementation is expensive because the process for manufacturing protuberances on the surface of a tube is not easy to carry out and its feasibility on an industrial scale has not been demonstrated. Furthermore, this implementation binds the protuberances to the surface on which the fluid is flowing and this makes any modification of the protuberances or of the surface difficult. This also complicates the supplying because the complexity of such a component limits the number of suppliers. Therefore, this implementation cannot be adapted to the automobile area, where flexibility and costs are parameters that direct the design. Finally, the bulkiness of such a system does not allow it to be integrated into a vehicle, when the geometric limitations of the vehicle are taken in to consideration.

SUMMARY

One goal is to provide an air conditioner by absorption that overcomes the disadvantages of the prior art documents cited above and in particular, first of all, to provide an air conditioner by absorption that has an elevated absorption yield without, however, requiring complex components for its implementation.

To this end a first aspect of the invention relates to an absorption plate for a vehicle air conditioner.

The plate improves the absorption efficiency of the absorbing fluid by homogenizing the flow along the exchange surface or grid. In other words, all along the flow, the temperature of the absorbing fluid and/or the concentration of the refrigerating fluid in the absorbing fluid tend to be homogenous in such a manner that there is little difference of temperature and of concentration between the surface layer and the zone in the center of the film.

These means of turbulence and/or of instability in accordance with this implementation are efficient for homogenizing the flow of absorbing fluid. They take advantage of characteristics of the flow for increasing its instability in order to cause turbulent currents that will homogenize the temperature of the flow of absorbing fluid and/or the concentration of refrigerating fluid in the flow of absorbing fluid. These means of turbulence and/or of instability do not make the plate excessively complex because they are distinct from the exchange surface, which is generally complex. The disclosed air conditioner by absorption allows for the possibility of standardizing the plates and of maintaining a manufacturing cost of interest while improving the absorption efficiency with distinct turbulence means.

The plate also improves the efficiency of the absorption by the absorbing fluid by bringing about at least a mixture of the flow along the exchange surface in order to render uniform the temperature and the concentration of refrigerating fluid. In other words, the surface layer is mixed with the rest of the absorbing fluid in such a manner that the surface layer downstream from the mixing/homogenizing means is not saturated with refrigerating fluid. As a consequence, the absorbing fluid downstream from the homogenization means can then reabsorb the refrigerating fluid efficiently.

A second aspect is a vehicle air conditioner comprising at least one absorption plate.

A further aspect is an automobile comprising at least one air conditioner having such an absorption plate.

BRIEF DESCRIPTION OF THE FIGURES

Other characteristics and advantages of the present invention will appear more clearly upon a reading of the following detailed description of an embodiment of the invention given as a non-limiting example and illustrated by the attached drawings in which:

FIG. 1 shows an absorption plate in accordance with the prior art;

FIG. 2 shows an absorption plate in accordance with a first embodiment of the absorption plate;

FIG. 3 shows an absorption plate in accordance with a second embodiment of the absorption plate;

FIG. 4 shows an absorption plate in accordance with a third embodiment of the absorption plate;

FIG. 5 shows an absorption plate in accordance with a fourth embodiment of the absorption plate;

FIG. 6 shows an absorption plate in accordance with a fifth embodiment of the absorption plate;

DESCRIPTION

Figure 7:
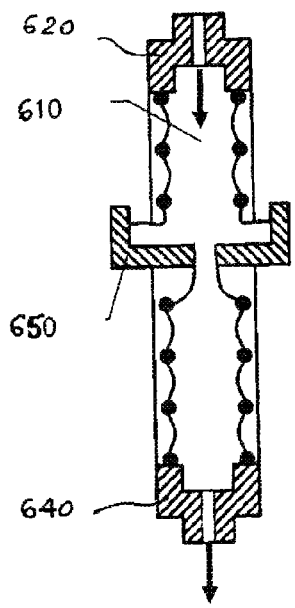
FIG. 7 shows an absorption plate in accordance with a sixth embodiment of the absorption plate.

FIG. 1 shows an absorption plate like those known in the prior art. Two exchange surfaces or grids 30 define a conduit into which a flow of absorbing fluid 10, of lithium bromide, for example, circulates by gravity. A frame integrates the grids 30 and its upper part 20 comprises a feed hole through which the absorbing fluid enters between the two plates. The lower part 40 comprises, for its part, an exit hole connected to the rest of the absorbing fluid circuit. The flow between the two plates is substantially laminar, as the arrows between the grids 30 show. The plate is arranged in a reservoir containing a gaseous phase rich in refrigerating vapor. This can be water in the form of vapor, for example.

During the course of its trajectory between the two plates the lithium bromide absorbs the water through the grids 30 in their outer layer. The lithium bromide becomes loaded with water and its concentration of water of the saline solution of lithium bromide will increase as well as its temperature. The absorption capacity is limited by the transfer rate in the direction of the center of the flow of saline solution of the refrigerant absorbed on the surface of the saline solution and of the heat released. In the case of a flow of lithium bromide that is laminar or slightly unstable the heat released at the surface and the absorbed refrigerant diffuse very slowly in the direction of the center of the flow of saline solution.

FIG. 2 shows a first illustrative embodiment of a plate according to a in which two obstacles 150 are arranged in the flow of lithium bromide 110. These obstacles form stop points for the fluid and downstream of each obstacle 150 eddies or vortices are caused in such a manner that the flowing out becomes unstable and a homogenization of the temperature and/or of the concentration of water in the lithium bromide is brought about. The outer layer of the flow is mixed in the rest of the flow and the temperature and/or the concentration in water of the lithium bromide is lowered in the zone in the proximity of the grid, which allows the efficiency of the absorption and of the air conditioner to be increased. The obstacles 150 are connected, for example, to the frame by a wire and their form can be varied (prismatic, spherical or even any one desired).

FIG. 3 shows a second illustrative embodiment whereby the obstacle 255 is arranged on a grid 230. The presence of the obstacle 255 in the flow 210 establishes a stop point on the one hand and a variation of the section of the flowing out on the other hand. The result is an increasing of the instability of the flow and the flow's turbulence increases.

The streams of the initial flow become mixed and the temperature and/or the concentration in water of the lithium bromide becomes homogenized in such a manner that the efficiency of the absorption is improved. The obstacle 255 is advantageously fixed on the grid and on the frame and serves as reinforcement. This embodiment provides on the one hand an increase in the efficiency of the air conditioner and allows at the same time an increase in the rigidity of the plates.

FIG. 4 shows a third illustrative embodiment in which the refrigerant vapor is injected into the flow 310 in the form of bubbles. To this end a conduit 360 connected to a high-pressure refrigerant vapor zone is placed on a grid 330 and can inject bubbles 365 of refrigerant into the flow 310. The refrigerant bubbles rise in the flow and their movement causes instabilities and turbulent eddies in the flow 310 of lithium bromide, causing a homogenization of the temperature and/or of the concentration in water of the lithium bromide. The conduit 360 advantageously serves as a reinforcement of the grid and allows the plate to be rigidified by being connected to the frame. Also, the injecting into the flow of lithium bromide of the vapor taken in the reservoir can be envisaged, which even further increases the efficiency of the system.

FIG. 5 shows a fourth illustrative embodiment. The flow 410 is heated locally by an electrical resistor placed on a grid 430. The increase of local temperature of the saline solution of lithium bromide generates a force of floatability at the origin of an outflow opposed to the main flow 410, which forces a homogenization of the temperature and/or of the concentration in water of the lithium bromide. The resistor 470 advantageously serves as a reinforcement to the grid and allows the plate to be rigidified by being connected to the frame.

FIG. 6 shows a fifth illustrative embodiment. Vibrators 580 are fixed to the grid 530 and put it in vibration. The flow in the area of the vibrators is consequently modified, which brings about an augmentation of its instability and the turbulence increases.

The streams of the bromide flow will then be mixed and the temperature and/or the concentration in water of the lithium bromide is homogenized. The efficiency is improved. The vibrators 580 advantageously serve as a reinforcement for the grid 530 and allow the plate to be rigidified by being connected to the frame. The vibrators 580 are arranged in a staggered configuration and vibrate in phase opposition. The flow in the area of the vibrators is therefore greatly modified and it is greatly heterogeneous all along the flow 510. The homogenization is greatly improved with this particularly advantageous implementation.

FIG. 7 shows a sixth illustrative embodiment. A buffer reservoir 650 was inserted in the flow of the absorbing fluid 610. Two vertical walls form a collector into which the grids directly discharge the flow of absorbing fluid. The buffer reservoir 650 temporarily stores the absorbing fluid before redirecting it between the grids 630. The intermediate storage in the buffer reservoir has the effect of mixing the flow of absorbing fluid and the surface layer charged with absorbed water will be diluted in the rest of the flow in such a manner that downstream from the buffer reservoir 650 the surface layer has a concentration of water and/or a lower temperature than upstream from the buffer reservoir and presents an improved absorption capacity. At least two variants of the evacuation of the reservoir can be envisaged, to wit, distinct orifices that have the effect of maximizing the mixture of the absorbing fluid, or a slot that has the effect of maximizing the distribution of the absorbing fluid in the grids 630.

Figure 8:
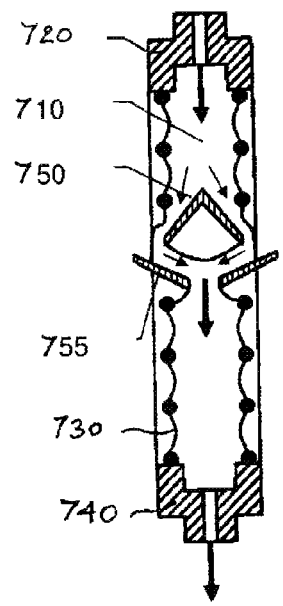
FIG. 8 shows an absorption plate in accordance with a seventh embodiment of the absorption plate.

FIG. 8 shows a seventh illustrative embodiment. Two blades 750 are arranged in the flow of the absorbing fluid and separate it into two secondary flows that are then reunited by two convergent blades 755 and that redistribute it between the two grids 730. During these transformations of the flow by the blades 750 and 755 the absorbing fluid 710 is agitated and the surface layer is mixed into the rest of the flow of absorbing fluid 710. The result is the uniformization of the temperature and of the concentration in water of the lithium bromide that allows it to absorb more water downstream from the blades 750 and 755.

Figure 9:
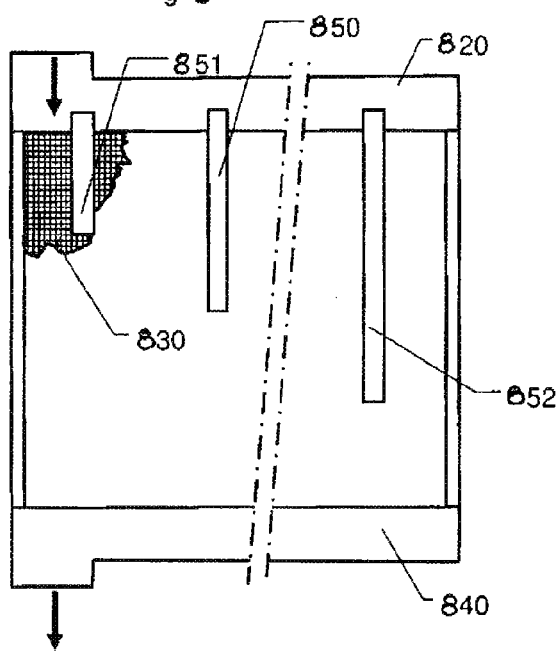
FIG. 9 shows an absorption plate in accordance with an eighth embodiment of the absorption plate.
Figure 10:
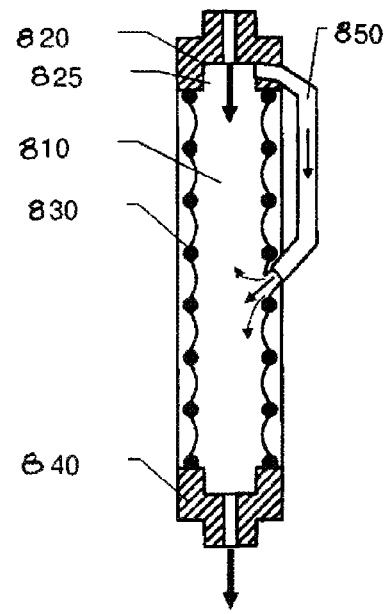
FIG. 10 shows the plate of FIG. 9 in cross-section.

FIGS. 9 and 10 show an eighth illustrative embodiment of the plate, in which three injection tubes 850, 851 and 852 feed the main flow 810 of lithium bromide along the grid 830. At the locations at which the secondary flows are injected, eddies are caused in such a manner that the flow becomes unstable and a homogenization of the temperature and/or the concentration in water of the lithium bromide is brought about. The external layer of the flow is mixed into the rest of the flow and the temperature and/or the concentration in water of the lithium bromide is lowered in the zone in the proximity of the grid 830, which allows the efficiency of the absorption and of the air conditioning to be increased. The tubes 850, 851, 852 are, for example, at one quarter, one half and at three quarters of the height of the grid in order to bring about three regenerations of the flow of the absorbing fluid in order to maximize the efficiency. The injection tubes 850, 851, 852 are directly connected to the main feed chamber 825 in order to avoid adding a specific feed pump for lithium bromide for the secondary flows.

Figure 11:
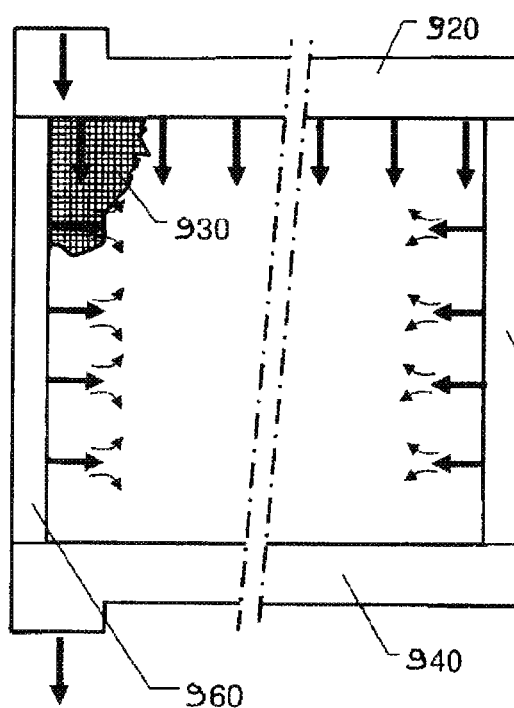
FIG. 11 shows an absorption plate in accordance with the ninth embodiment of the absorption plate viewed from the front.
Figure 12:
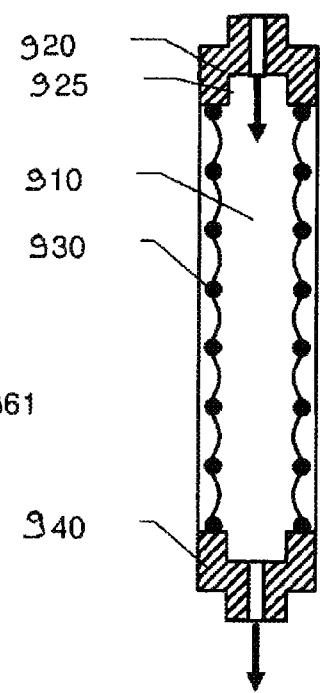
FIG. 12 shows the plate of FIG. 11 in cross-section.

FIGS. 11 and 12 show a ninth illustrative embodiment of the plate in which the sidewalls 960 and 961 of the frame feed the main flow 910 of lithium bromide along the grid 930. An agitation is brought about along the sidewalls 960 and 961 where the secondary flows are injected in such a manner that the flow becomes unstable and a homogenization of the temperature and/or of the concentration in water of the lithium bromide is brought about. The external layer of the flow mixes into the rest of the flow and the temperature and/or the concentration in water of the lithium bromide is lowered in the zone in the proximity of the grid, which allows the efficiency of the absorption and of the air conditioner to be increased. The side walls 960 and 961 are directly connected to the main feed chamber 925 in order to avoid adding a specific feed pump for lithium bromide for the secondary flows.

It is understood that various modifications and/or improvements obvious to the person skilled in the art can be added to the different embodiments of the plate described in the present specification without departing from the scope of the invention defined by the attached claims. In particular, the multiplying of the turbulence means on one and the same plate can be envisaged and their usage can also be mixed in order to perform several different implementations on one and the same plate.

In particular, reference is made to the integrating of a mixing device into the flow of absorbing fluid, but it can also be envisaged that several of them can be integrated at the same time. Finally, it is also possible to envisage implementing an overflow port in the buffer reservoir to prevent any overflow.

In particular, it can be envisaged that the injection orifices are multiplied on each injection tube in such a manner several regenerations of absorbing fluid are carried out along the same injection tube.

The invention claimed is:

1. An absorption plate for an air conditioner for a vehicle, traversed by a flow of absorbing fluid flowing along at least one exchange surface, whereby the exothermal absorption of a refrigerating fluid by the absorbing fluid takes place by the at least one exchange surface by increasing a concentration of the refrigerating fluid in the absorbing fluid, the absorption plate comprising an inlet member though which absorbing fluid enters the absorption plate, an outlet member through which absorbing fluid exits said absorption plate, and first and second side member extending between said inlet and outlet members; said inlet, outlet and side members defining a flow path for absorbent fluid; at least one of said side members comprising said at least one exchange surface; said at least one exchange surface comprising a grid through which a refrigerant can pass to be absorbed by the absorbing fluid; said absorption plate further comprising means positioned along the at least one exchange surface for homogenizing the temperature of the flow of absorbing fluid and the concentration of refrigerant in the absorbing fluid, characterized in that the homogenization means is distinct from the at least one exchange surface; said homogenization means comprising a buffer reservoir which divides said flow path into at least a first portion and a second portion below said first portion; said buffer reservoir comprising:
   an entrance for capturing the flow of absorbing fluid flowing along the at least one exchange surface from said first portion of said flow path;
   a reservoir having for mixing absorbing fluid, said reservoir having a bottom surface; and
   at least one outlet in communication with said second portion of said flow path, said at least one outlet being arranged in said bottom surface of said reservoir for distributing the flow of absorbing fluid mixed on the at least one exchange surface to said second portion of said flow path.

2. The absorption plate according to claim 1, wherein the homogenization means comprises at least one obstacle arranged in the flow of the absorbing fluid.

3. The absorption plate according to claim 2, wherein the plate comprises a frame holding at least one exchange grid in place which defines the exchange surface for the flow of absorbing fluid, wherein the at least one obstacle is arranged on the exchange grid.

4. The absorption plate according to claim 3, wherein the at least one obstacle serves as reinforcement for the exchange grid.

5. The absorption plate according to claim 1, wherein the plate comprises a frame holding in place two exchange grids forming two exchange surfaces and between which a conduit for the flow of absorbing fluid is defined, wherein the entrance of the buffer reservoir is a collector formed by at least two walls between which the two exchange grids discharge the flow of absorbing fluid and that the at least one outlet comprises a series of holes suitable for evacuating the absorbing fluid between the two exchange grids.

6. The absorption plate according to claim 1, wherein the plate comprises a frame holding in place two exchange grids forming two exchange surfaces and between which a conduit for the flow of absorbing fluid is defined, wherein the entrance of the buffer reservoir is a collector formed by at least two walls between which the two exchange grids discharge the flow of absorbing fluid and that the at least one outlet comprises a slot suitable for evacuating the absorbing fluid between the two exchange grids.

7. The absorption plate according to claim 5, wherein the buffer reservoir is fixed to the frame and serves as reinforcement for the exchange grids.

8. The absorption plate according to claim 1, wherein the mixing means comprises means for separating the main flow into secondary flows and associated collection means for collecting the secondary flows in order to re-form the main flow.

9. The absorption plate according to claim 8, wherein the separation means comprises at least two divergent blades arranged in the flow of absorbing fluid, and that the collection means comprises two convergent blades arranged downstream from the divergent blades.

10. An air conditioner for a vehicle, comprising at least one absorption plate in accordance with claim 1.

11. An automobile comprising at least one air conditioner by absorption according to claim 10.

* * * * *